United States Patent [19]
Havark

[11] 3,897,162
[45] July 29, 1975

[54] NONRELEASABLE CONNECTING DEVICE
[76] Inventor: Steven Havark, 5415 W. Barry, Chicago, Ill. 60641
[22] Filed: Nov. 4, 1974
[21] Appl. No.: 520,488

[52] U.S. Cl. ............... 403/353; 403/316; 403/326; 29/453; 24/221; 292/307 R
[51] Int. Cl.² ..................... B25G 3/00; F16D 1/00
[58] Field of Search .......... 403/353, 361, 316, 326; 285/80; 137/383, 384; 242/118.61, 118.7; 292/307; 105/200; 29/453; 24/221 R; 85/4, 1 K

[56] References Cited
UNITED STATES PATENTS

| | | | |
|---|---|---|---|
| 2,155,584 | 4/1939 | Bryant et al. | 29/453 X |
| 2,981,995 | 5/1961 | Golubics | 24/221 R |
| 3,339,861 | 9/1967 | Montesi | 242/118.7 |
| 3,345,710 | 10/1967 | Bush | 24/221 R |
| 3,675,499 | 7/1972 | Marosy | 403/353 X |
| 3,816,883 | 6/1974 | Dzus | 24/221 R |

Primary Examiner—Werner H. Schroeder
Assistant Examiner—Wayne L. Shedd
Attorney, Agent, or Firm—Fitch, Even, Tabin & Luedeka

[57] ABSTRACT

A nonreleasable connecting device is disclosed which includes first and second elements, each of which have elongated shaft and generally flat circular head portions, the shafts being cooperatively configured for sliding engagement. The first element has a shaft with spaced apart radially directed surfaces connected by smooth ramp surfaces. The second element has a split shaft with a central opening adapted to receive the shaft of the first element and a slot in its head portion through which a locking member of the first element can pass. Insertion of the first element shaft into the second element shaft so that the locking member passes through the slot a predetermined distance, followed by rotation of the first element about one quarter revolution relative to the second element and subsequent retraction causes the locking member to engage internal recesses in the second element and permanently lock the first and second element together.

14 Claims, 3 Drawing Figures

NONRELEASABLE CONNECTING DEVICE

The present invention generally relates to connectors or fasteners and, more particularly, relates to nonreleasable connectors of the type which comprise two elements which interlock together.

There are many applications for fasteners or connecting devices wherein the connector is of the type which has two elements that are interlocked together and where it is particularly desirous that the connector not become separated. It may be also desirable that the connector not be releasable because of the desired permanency of the connection being made, such as, for example, to maintain a seal on a box, envelope, attache case or the like. A connector that cannot be released except by destruction would provide such a seal. The use of such seals can be effective in reducing tampering and theft of the contents of a container. Although such a connector would probably not provide ultimate security for the reason that it is preferably made of a plastic-like material that could be relatively easily cut, it would provide an indication of tampering and may dissuade breaking of the seal. If important records or other documents were to be protected from theft or unauthorized inspection, a properly designed container, together with a nonreleasable connecting device would be quite useful.

Accordingly, it is a primary object of the present invention to provide a connecting device comprised of two elements which are lockable together in such manner that the elements may not be separated, except by destroying the device.

Yet another object of the present invention is to provide a connecting device as described above which is easily applied, is compact and effective and is easily and inexpensively manufactured.

Other objects and advantages will become apparent upon reading the following detailed description, while referring to the attached drawings, in which.

Figures 1, 2, 3:
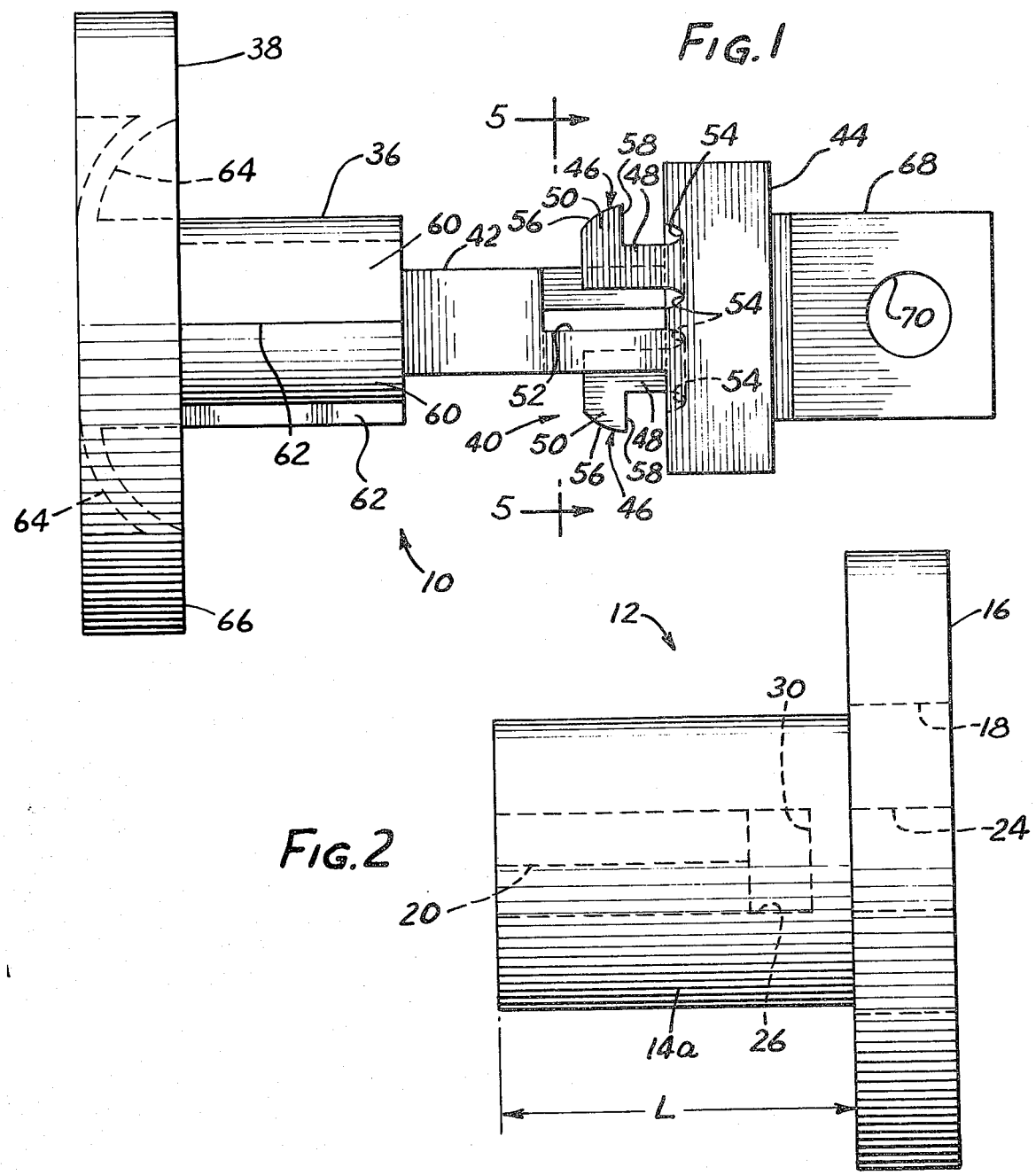
FIG. 1 is a front elevation of one of the cooperating elements of the connecting device embodying the present invention.
FIG. 2 is a front elevation of another of the cooperative elements embodying the present invention.
FIG. 3 is a top view of a portion of the element shown in FIG. 1.

Broadly stated, and referring to FIGS. 1 and 2, a connecting device embodying the present invention is shown to comprise separate elements 10 and 12 which are adapted to be interconnected. The connector elements 10 and 12 are interlocked and cannot be released or separated, except by cutting or breaking either the shaft or one of the head portions, which would destroy the connector in either case, as is desired. In this regard, it is preferred that the connector element can be fabricated from a resilient material that will permit marginal flexing, since it is necessary for portions of the connector to be somewhat resilient and flexible, particularly when the connector is locked into engagement, as will be hereinafter described in greater detail. Similarly, portions of the element 12 undergo flexing during locking and it is accordingly preferred that this element be fabricated from a similar resilient material. It is also preferred that the two elements 10 and 12 be produced from substantially similar material for aesthetic appeal.

Figure 6:
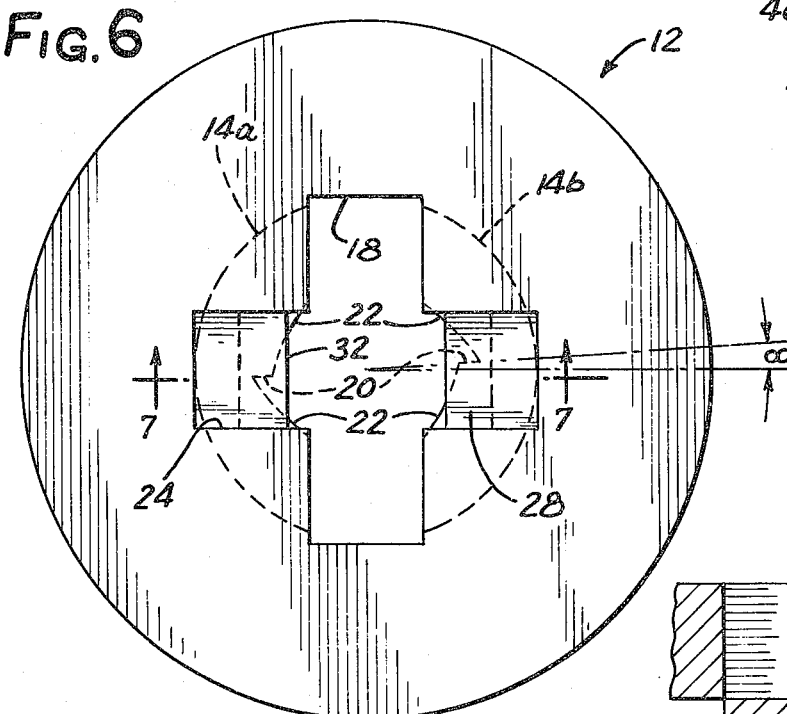
FIG. 6 is a right end view of the element shown in FIG. 2.
Figure 7:
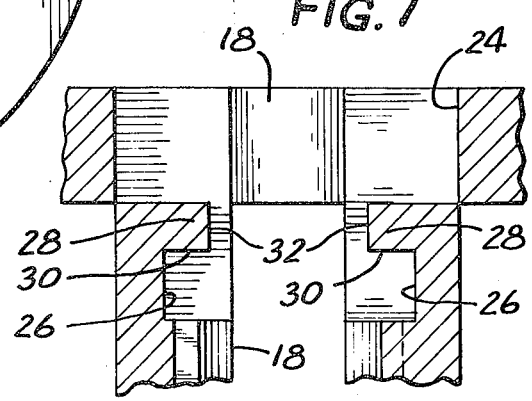
FIG. 7 is a cross-section taken generally along the line 7—7 of FIG. 5.

Referring initially to the element 12 which receives the element 10 in cooperative locking engagement, and particularly to FIGS. 2, 6, 7, the receptive element 12 has an elongated shaft of a length L and comprises two half sections 14a and 14b. The shaft is integrally formed with a generally flat circular end or head portion 16, the end having an outer diameter larger than the diameter of the elongated shaft. As is best shown in FIG. 6, the element 12 has a generally rectangular shaped slot 18 extending the entire length of the element, the slot separating the shaft into the two half sections 14a and 14b with the slot also extending through the head portion 16 so that it is continuous through the entire length thereof. Referring to the interior portion of the half sections 14a and 14b of the shaft shown in FIGS. 2 and 6, a pair of radially directed surfaces 20 are shown to be connected by ramp surfaces 22 which are curved so as to extend from the edge of the slot 18 to the radial surfaces. The ramp surfaces 22 and radial surfaces 20 cooperate with correspondingly configured surfaces of the element 10 and produce a larger outside diameter of the shaft 14 in response to relative rotational movement of the elements 10 and 12. Stated in other words, the configuration of the shafts of the respective elements 10 and 12 is such that when one element is rotated about 90° relative to the other so that it is placed into locking engagement, the shaft of the element 10 will cause radial expansion of the shaft of the element 12 which can have the effect of tightening the connector in certain applications. As is best shown in FIGS. 6 and 7, the head portion 16 of the element 12 has, in addition to the elongated slot 18, an additional slot 24 which is of substantially similar rectangular configuration and has its longer dimension perpendicular to the length of the slot 18. Moreover, the element 12 has a pair of internal recesses 26 generally aligned with the length of the slot 24 and a bridge portion 28 separating the slot 24 from the recess 26, with the lower surface 30 of the bridge 28 defining a locking surface for cooperative engagement with a corresponding portion of the element 10. As is best shown in FIG. 7, the bridge portion 28 also has the surface 32 spaced a slight distance away from the sides of the slot 18 to permit the locking member to more easily pass by the bridge to engage the locking surface.

In accordance with another aspect of the present invention, in referring to FIGS. 1, 3, 4 and 5 and which illustrate the element 10 that is adapted to engage the receptive element 12, it comprises a shaft portion 36, an enlarged circular end or head 38 preferably integrally formed therewith and a locking member, indicated generally at 40, attached to the end of the shaft opposite said head portion 38. The locking member 40 has a small generally square cross section portion 42 extending from the end of the shaft 36 to a rectangular shaped portion 44 that is only slightly smaller in size than the slot 18 of the element 12 so that it is insertable therein during engagement. A pair of generally L-shaped locking arms 46 are provided, with the arms having an axially aligned portion 48 to which a transverse portion 50 is integrally formed therewith. The locking arms are deflectable radially inwardly during engagement and, accordingly, the portion 42 of the locking element immediately inwardly of the axial portion 48 of the locking arm is cut away to permit inward flexing thereof. Moreover, a small rectangular slot 52 is also present in the center as best shown in FIG. 1.

The locking arms 46 are attached to the larger portion 44 of the locking member 40 and are preferably integrally formed therewith so that inward flexing of the arms may occur during locking engagement of the elements 10 and 12. To facilitate flexing of the L-shaped arms 46, reverse fillets 54 are provided where the base of the locking arms merge into the rectangular shaped portion 44 so that excessive localized stress in the area of the intersection can be minimized. This can be important in the event the material used in fabricating the elements is less flexible and more susceptible to being easily cracked or broken. The fillets 54 provide a greater length over which the parallel portion 48 can deflect and also eliminates the sharp corner at the intersection of the portion 44 and locking arm which could cause a rupture of the material.

As is best shown in FIG. 1, the axially aligned portions 50 of the locking arms have their outer surface 56 curved so as to cause the locking arms to be deflected inwardly in the event the surface 56 contacts a stationary surface as the element 10 is moved to the left as shown in FIG. 1. It should be understood that during locking engagement, the locking arms 46 come into contact with the bridge portions 28 of the element 12 which causes the locking arms 46 to be inwardly deflected. When the element 10 has been inserted a sufficient distance into the element 12, a rearward surface 58 of the transverse portion 50 engages the locking surface 30 of the bridge portion 28 and locks the two elements together. Since access to the locking arms is not possible after the elements have been interconnected, the connector is nonreleasable unless the shafts or heads are severed or otherwise destroyed.

Figure 4:
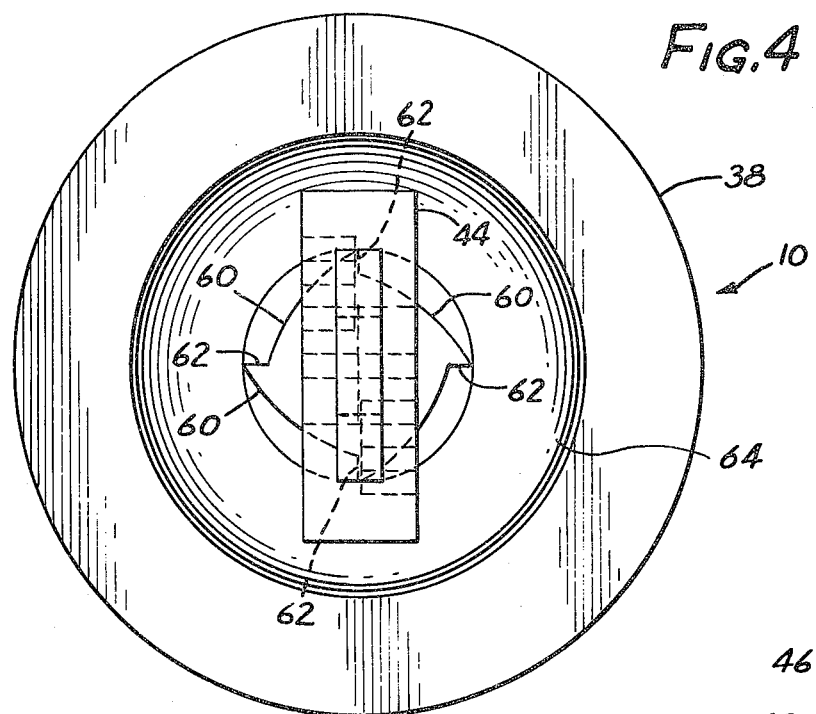
FIG. 4 is a right end view of the element shown in FIG. 1.
Figure 5:
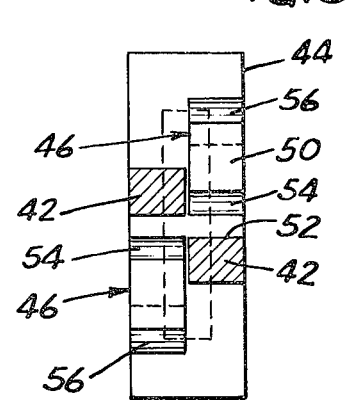
FIG. 5 is a cross-section taken generally along the line 5—5 of FIG. 1.

In accordance with yet another aspect of the present invention, the shaft 36 the element 10 has an outer configuration comprising a number of curved surfaces 60 which gradually curve outwardly in a clockwise direction as viewed in FIG. 4 until they terminate in radial surfaces 62. The curved surfaces 60 generally define ramp surfaces which are effective to expand the split shaft portions 14a and 14b as the elements are rotated relative to one another. In this regard, the cross sectional configuration of the shaft 36 is substantially similar to the configuration of the opening between the half sections 14a and 14b of the shaft of the element 12 so that the shaft 36 may be inserted therein in generally snug engagement. When the element 10 is rotated approximately 90° relative to the element 12, the ramp surfaces 60 will expand the half sections 14a and 14b relative to one another and cause the effective outside diameter thereof to be increased which, in certain applications, will have the effect of providing a tighter connection by the device against the components being connected. It should also be understood that the radial surfaces 20 of the element 12 are offset from the horizontal as shown in FIG. 6 by a small angle $\alpha$ which is preferably a few degrees, such as, for example, within the range of about 3° to 10°, so that rotation of the elements relative to one another about 90° will not have the effect of permitting the half sections to snap back to their original smaller effective outside diameter. The angle $\alpha$ should be such that it will permit the shaft 36 to be relatively easily inserted in the shaft half sections 14a and 14b, but not sufficiently small so that the half sections 14a and 14b will be permitted to snap back as described.

In keeping with the present invention, the enlarged annular head 38 preferably has a relatively thin annulus 64 which interconnects the central shaft 36 with the outer peripheral portion 66 and which is curved toward the right as shown in FIG. 1 as it extends outwardly. This curvature permits maximum deflection of the outer peripheral portion relative to the shaft which is desirable during interconnection of the elements 10 and 12. The deflection is necessary because the outer portion 66 contacts the end surface of the shaft of the element 12 during interconnection with the shaft lengths being in the relative proportions shown in the drawing. A grip portion 68 can be optionally provided at the end of the locking portion 40 to facilitate interconnection of the elements. The grip portion 68 is shown to be of a generally rectangular shape and is preferably integrally formed with the locking member. The grip preferably has a smaller cross sectional area at the point of attachment to the portion 44 so that it may be readily cut or broken away therefrom after interconnection has been achieved. An aperture 70 may be provided to facilitate handling.

In keeping with the present invention, the mode of attachment or interconnection of the two elements involves the insertion of the locking member 40 into the slot 18 so that the rectangular portion 44 is passed therethrough. The element 10 is inserted a predetermined distance into the slot 18 of the element 12 so that the transverse portion 50 of each of the locking arms clears the outer end of the head 16 of the element 12. In so doing, it is necessary for the annulus 64 to be deflected because of the contact by the outer peripheral portion 66 of the head 38 against the end of the shaft of the element 12. Inserting the element 10 so that the locking arms clear the outer surface of the head 16 will enable rotation of the elements relative to one another about 90° where the locking member including the locking arms 46 is generally aligned with the slot 24. The elements 10, 12 are then moved so that the respective heads are retracted or moved away from one another so that the surface 56 of the locking arms 46 are brought into contact with bridge portion 28 which causes the locking arms to be moved inwardly toward one another. Further movement enables the rearward surfaces 58 of the locking arms to clear the bridge portion 28 and engage the locking surfaces 30. Since the rectangular shaped portion 44 of the locking member 40 is substantially the size of the slot 24, access to the locking arms 46 is prohibited so that it is not possible to release the locking arms from the locking surfaces 30 except by destroying the device.

While the mechanical locking engagement of the elements has been specifically shown and described, it is also contemplated that ultrasonic welding, solvent bonding or the like may be used to supplement the described mechanical locking engagement.

In keeping with the present invention, it is preferred that the connector elements be fabricated from a resilient, deflectable material, such as, for example, nylon, polyolefin, copolymers as well as homopolymers of acetyl formaldehyde, rubber modified polystyrene, ABS, polyvinyl chloride or other suitable material that can be molded or formed.

From the foregoing detailed description, it should be understood that an improved connecting device of the type which can be released only by destroying the same has been shown and described. It is, of course, understood that although preferred embodiments of the present invention have been illustrated and described, various modifications thereof will become apparent to those skilled in the art and, accordingly, the scope of the present invention should be defined only by the appended claims and equivalents thereof.

Various features of the invention are set forth in the following claims:

What is claimed is:

1. A connecting device comprising first and second members, each having elongated shaft means and head means, said members being interconnectable and lockable together;

said first member having an elongated shaft with a number of radially directed surfaces extending along the length thereof, the innermost portion of one radial surface being connected to the outermost surface of an adjacent radial surface by a curved generally continuous surface, said first member having a locking end portion attached to the end of said shaft for connection to said second member;

said second member having an elongated split shaft with a central opening therein adapted to receive the shaft of said first member in cooperative engagement and a slot in the head means thereof through which said locking end portion of said first member passes, said second member having recesses on opposite sides of said slot for receiving cooperating portions of said locking end portion when said locking end portion is inserted a predetermined distance and rotated about one fourth turn relative to said second member and moved into locking engagement with said recesses, said rotation causing said first member shaft to radially expand said split shaft of said second member.

2. A connecting device as defined in claim 1 wherein said locking end portion includes a pair of radially inwardly deflectable locking arms having locking tabs on the outer end portion adapted to pass by and thereafter engage a surface of said recess after rotation and retractive axial movement.

3. A connecting device as defined in claim 1 wherein each of said head means comprises a generally flat circular configuration.

4. A nonreleasable connector comprising first and second elements, each of said elements having an elongated shaft and enlarged head means attached thereto, said elements cooperatively locking together, said elongated shaft of said first element having a number of generally radially directed surfaces extending along the length thereof, with the circumference between adjacent radial surfaces gradually sweeping radially outwardly from the inner edge of the radial surface to the outer edge of an adjacent radial surface to thereby define a curved ramp surface therebetween;

said elongated shaft of said second element having two half sections and a central opening therein adapted to receive the shaft of the first element, said first element having a locking member at the end of said shaft opposite said head means, said locking member including one or more integrally formed locking arms, one or more of which is radially deflectable to enable movement by and subsequent engagement with a locking surface, said head means of said second element containing a rectangular slot adapted to receive said locking member when the shaft of said first element is inserted into the central opening of the shaft of the second element and the locking member is passed through said elongated slot, said second element further including recesses adjacent said slot for receiving said locking arms when said first and second elements are brought together sufficiently to permit rotation of one relative to the other, are thereafter rotated about ¼ revolution relative to one another and retracted into locking engagement.

5. A connector as defined in claim 4 wherein said enlarged head means are of a generally flat circular shape.

6. A connector as defined in claim 4 wherein said generally flat circular shaped head of said first element includes a relatively thin annulus between the outer circumference thereof and the outside diameter of the shaft thereof to permit axial flexing of said shaft relative to the outer circumferential portion of said head.

7. A connector as defined in claim 6 wherein the length of said second element shaft is such that said first element can only be rotated relative thereto when said locking arms of said locking member clear the sidewalls of said slot, said condition requiring axial movement of the center relative to the circumferential portion of said first element head means.

8. A connector as defined in claim 4 wherein said locking member further includes an integrally formed removable grip means secured to the end of said locking member for facilitating insertion of said first element in said second element.

9. A connector as defined in claim 4 wherein the outer surface configuration of said first and the inner surface configuration of said second element shafts are sufficiently similar to permit sliding axial movement during connection thereof, said ramp surfaces causing said half sections of said shaft of said second element to be separated and thereby enlarge said second element shaft in response to rotation of said first element relative to said second element when said locking member is rotated into engagement with said recesses of said second element.

10. A connector as defined in claim 4 wherein said first element shaft includes four radial surfaces generally equally spaced around the circumference, with each of the radial surfaces being aligned either generally parallel or perpendicular to said elongated slot when said locking member is inserted therein.

11. A connector as defined in claim 10 wherein said shaft of said second element is radially enlarged the maximum amount when said locking member is rotated such that said locking arms engage said recesses.

12. A connector as defined in claim 4 wherein said first and second elements are fabricated from a resilient plastic-like material.

13. A connector as defined in claim 4 wherein said locking arms are radially inwardly deflectible and said end of said locking member being generally flush with the end surface of said head of said second element when said elements are interlocked together.

14. A connector as defined in claim 4 wherein said recesses are located in the sidewalls of said slot of said second member so that locking engagement by said first element locking arms is internal and thereby precludes access and release of said elements from one another.

* * * * *